United States Patent [19]

Seid

[11] Patent Number: 5,754,543

[45] Date of Patent: May 19, 1998

[54] CONNECTIVITY MATRIX-BASED MULTI-COST ROUTING

[75] Inventor: Howard A. Seid, Fairfax, Va.

[73] Assignee: Alcatel Data Networks, Inc., Ashburn, Va.

[21] Appl. No.: 675,166

[22] Filed: Jul. 3, 1996

[51] Int. Cl.⁶ .................................................. H04J 3/24
[52] U.S. Cl. ........................... 370/351; 370/256; 370/408
[58] Field of Search ............................. 370/351, 389, 370/390, 391, 392, 395, 396, 428, 401, 406, 407, 408, 238, 254, 255, 256, 352, 353, 356, 355; 340/825.01, 825.03, 825.5, 825.51, 825.52

[56] References Cited

U.S. PATENT DOCUMENTS

| | | | |
|---|---|---|---|
| 5,251,205 | 10/1993 | Callon et al. | 370/60 |
| 5,265,092 | 11/1993 | Soloway et al. | 370/254 |
| 5,295,137 | 3/1994 | Jurkevich | 370/54 |
| 5,327,552 | 7/1994 | Liew | 395/575 |
| 5,420,857 | 5/1995 | Jurkevich | 370/60 |
| 5,430,727 | 7/1995 | Callon | 370/85.13 |
| 5,471,467 | 11/1995 | Johann | 370/60 |
| 5,477,536 | 12/1995 | Picard | 370/54 |

*Primary Examiner*—Dang Ton
*Attorney, Agent, or Firm*—Ware, Fressola, Van Der Sluys & Adolphson LLP

[57] ABSTRACT

Connectivity matrix-based multi-cost routing includes defining a generally additive operator which is able to add traditionally (arithmetic) additive cost factors and which takes into account cost factors which are not additive, the generally additive operator being defined such that distributive and communicative properties are applicable, and wherein the generally additive operator is applicable to connectivity matrix-based factors for determining the relative costs of paths within a network, particularly with respect to multi-cost factors. Connectivity matrix-based multi-cost routing is performed by first defining cost functions and establishing a criteria for prioritizing cost functions such that a composite multi-cost function includes the cost functions in the priority order defined by the criterion. A connectivity matrix is established including ordered n-tuples of cost factors corresponding to the priority established by the criterion, and a shortest path matrix determination is made by using the generally additive operator to apply the composite multi-cost function to the connectivity matrix. When links within a network support various functionality, a mask of a required functionality may be used to define a cost function for a given shortest path matrix determination. A correcting method is provided for a routing determination when, after a shortest path matrix determination, a routing choice is not provided which would otherwise satisfy a multi-cost requirement, the correcting method including the determination of a primary path and secondary paths between a source node and a destination node.

20 Claims, 7 Drawing Sheets

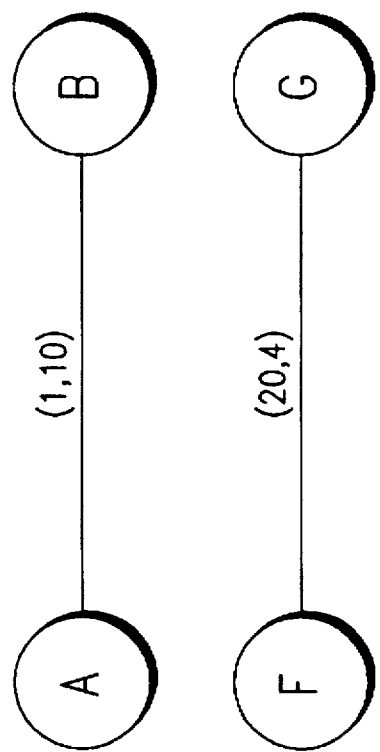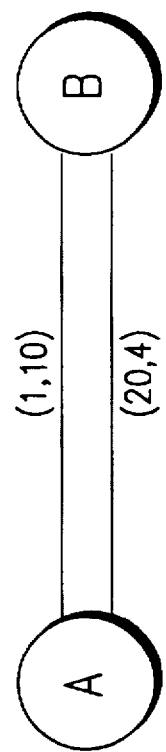

CONNECTIVITY MATRIX-BASED MULTI-COST ROUTING

TECHNICAL FIELD

The present invention relates to routing, and more particularly, to connectivity matrix-based multi-cost routing.

BACKGROUND OF THE INVENTION

Several well-known network routing algorithms are based on the generation of path choices in each routing node. For example, in a packet switching (packet-based) network containing a plurality of packet switching nodes interconnected by respective links, routing algorithms are used to route a packet from a source node to a destination node over various nodes and links within the network. Examples of packet-based networks include: frame relay (FR) networks wherein a packet corresponds to a FR frame; a cell-switching network, e.g., an asynchronous transfer mode (ATM) network, wherein a packet corresponds to an ATM cell; etc.

For purposes of routing a packet within a network, if there are n routing nodes in the network, each node is given a unique Node Number (NN) such that $1<=NN<=n$. The path choices are derived from the network node connectivity as specified in a n×n Connectivity Matrix (CM). The information stored in the i,j-th element of an n×n CM (CM[i,j]) is: c(i,j), the cost of a direct routing link between nodes i and j; $\infty$ if there is no direct routing link between node i and j; and $\phi$ (lowest cost connectivity) if node i is the same as node j.

A path between any two arbitrary nodes in the network is a sequence of nodes from the originating (source) node to the terminating (destination) node, where if node j directly follows node i in the sequence, there is a direct routing link between them. In order to select a "best" path, some figure of merit for any candidate path is derived. The figure of merit consists of the (additive) "costs" of each of the links between nodes derived from the CM. The link costs may include the (additive) "costs" associated with the nodes. Thus the cost of a path is just the sum of the link costs between adjacent nodes in the path sequence.

Regardless of the algorithm used to transform the network nodal connectivity to the "shortest path" between two nodes (e.g., Floyd's Algorithm or Dijkstra's Algorithm, both provided in *Introduction to Algorithms* by Thomas Cormen, Charles Leiserson and Ronald Rivest, (c) 1990, chapter 25 for Dijkstra's Algorithm and chapter 26 for Floyd's Algorithm, therein referred to as the Floyd-Warshall Algorithm, which is alternative nomenclature for Floyd's Algorithm), the "cost" of such a path is obtainable by taking the sum of the link costs (perhaps including some additive nodal cost), either using Floyd's Algorithm or Dijkstra's Algorithm to make the required determination. As long as there is a single link cost factor used to determine the cost for the logical or physical links between node i and node j, the approach to determining the shortest path value is straightforward.

The situation is not as clear cut when there are two or more independent cost factors used to determine a figure of merit aggregate cost for a path to be used in evaluating the best or shortest path. It will be understood that when multiple costs are considered for evaluating a best or shortest path, the various cost considerations lead to different "shortest path" conclusions. For example, if hop count, i.e., the number of nodes traversed by a packet from source to destination node, is an overwhelming concern, one path within a network may be the shortest path. Alternatively, if delay is the major factor, i.e., the time it takes for a packet to travel from the source to the destination node, then another path within the network may be the best path. Still different conclusions may be reached if other factors, such as monetary cost, are taken into consideration.

When single cost functions are used as a means of obtaining figures of merit for various paths within the network, the concept of adding the costs of each link in the path, as discussed above, is the natural way to obtain the result. Known routing algorithms assume that costs add as the path is traversed. Common cost functions, used in path selection (e.g., "delay", "cost of transmission line facility", "hop count"), are additive. Individually, they are immediately adaptable to standard CM-based path-cost-determination algorithms. However, there are other cost-factors (e.g., "per cent available bandwidth", "ability to handle a specific protocol", "ability to handle a certain packet type") which are major determiners of path selection, but which are not additive. These types of cost factors cannot be treated by usual CM-based methods. The reason is that arithmetic addition is too limiting to describe the actions of many cost factors.

Therefore, a method for handling multi-cost factors in determining the relative costs of paths within a network is needed. Additionally, this method for handling multi-cost factors should also be capable of considering non-additive cost factors in the relative costs of paths determination.

SUMMARY OF THE INVENTION

Objects of the present invention include network routing capable of handling multi-cost factors in determining the relative costs of paths within a network.

Another object of the invention is to provide such a network routing which is also capable of considering non-additive cost factors in the relative costs of paths determination.

According to the present invention, connectivity matrix-based multi-cost routing includes defining a generally additive operator which is able to add traditionally (arithmetic) additive cost factors and which takes into account cost factors which are not additive, the generally additive operator being defined such that distributive and commutative properties are applicable, and wherein the generally additive operator is applicable to connectivity matrix-based factors for determining the relative costs of paths within a network, particularly with respect to multi-cost factors.

In further accord with the present invention, connectivity matrix-based multi-cost routing is performed by first defining cost functions and establishing a criterion for prioritizing cost functions such that a composite multi-cost function includes the cost functions in the priority order defined by the criterion. A connectivity matrix is established including ordered n-tuples of cost factors corresponding to the priority established by the criterion, and a shortest path matrix determination is made by using the generally additive operator to apply the composite multi-cost function to the connectivity matrix.

In further accord with the present invention, the shortest path matrix is determined by applying Floyd's Algorithm or Dijkstra's Algorithm to a connectivity matrix using the generally additive operator.

In still further accord with the present invention, when links within a network support various functionality, a mask of a required functionality may be used to define a cost function for a given shortest path matrix determination.

According still further to the present invention, a routing method is provided for a routing determination after a shortest path matrix determination, the routing method including the determination of a primary path(s) and secondary paths between a source node and a destination node.

According still further to the present invention, the determination of primary paths and secondary paths between source nodes and destination nodes is provided by a criterion cost determination and a composite constraint multi-cost determination from each node adjacent to the source node to the destination node and using the criterion cost and composite constraint multi-cost for a link-by-link least cost determination, each primary path being determined as the path(s) from the source node to the destination node(s) through the adjacent node having the lowest generalized sum of the link multi-cost from the source node to one of its adjacent nodes and the multi-cost of the "best" path(s) from that adjacent node(s) to the destination node. The remaining ordered link least-criterion-costs of paths, if any, are the secondary links or paths.

According still further to the present invention, the routing method further includes the steps of establishing a criterion C, for routing from a source node to a destination node; establishing a maximum multi-cost metric allowed for a successful routing; determining an ordered list of paths, including the primary path(s) and secondary paths from the source node to the destination node; and establishing link least-criterion-costs and link composite-constraint-costs for each of the primary and secondary paths from the source node to the destination node. If, for a given required routing from a source node to a destination node (path), the maximum metrics are such that the metrics are greater than or equal to the link least-criterion-costs for each individual cost component, then there is a path from the source node to the destination node which has multi-cost metrics no more than those required. If, for a given path between the source node and the destination node, the metrics are such that at least one metric is less than a corresponding link least-criterion-cost for each link, but there is at least one link wherein the metrics are greater than or equal to the link lease-constraint-costs for each individual cost function, then there may or may not be a path which achieves a satisfaction of the cost element while still satisfying the other metrics of the cost element. Finally, if the metrics are less than the link least-constraint-costs, for at least one individual cost component within each link, then there is no successful path for meeting the metrics from the source node to the destination node.

The foregoing and other objects, features and advantages of the present invention will become more apparent in light of the following detailed description of an exemplary embodiment thereof, as illustrated in the accompanying drawings.

BRIEF DESCRIPTION OF THE DRAWINGS

FIG. 6a is schematic diagram illustrating how different cost functions may achieve minimums on different links between different pairs of nodes;

FIG. 6b is schematic diagram illustrating how different cost functions may achieve minimums on different links between a the same two nodes;

DETAILED DESCRIPTION OF THE INVENTION

Figure 1:
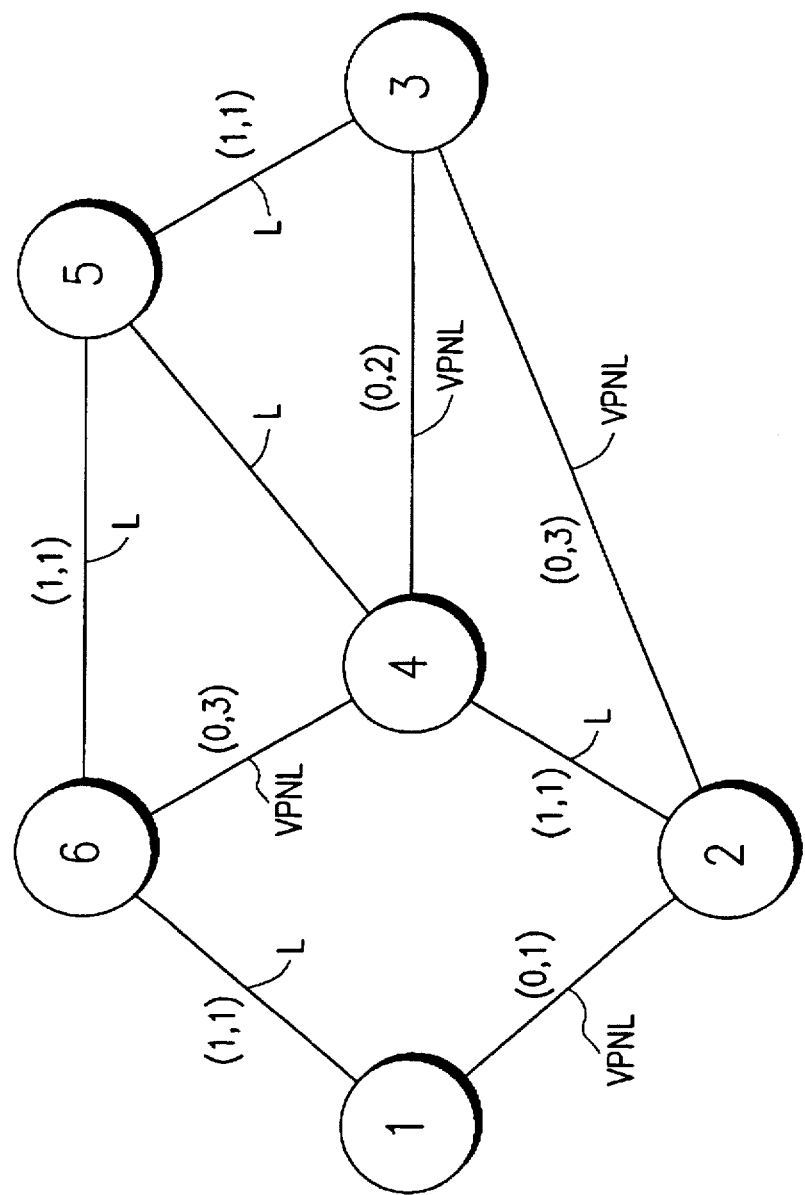
FIG. 1 is a schematic diagram of a virtual private network utilizing connectivity matrix-based multi-cost routing in accordance with the invention.

The present invention provides a method for handling multi-cost factors in the determination of the relative costs of paths within a network between a source node and a destination node. This method of handling multi-cost factors takes into consideration "non-additive" cost factors in the relative costs of paths determination. In the following description, the method of the invention for adding multi-costs to obtain a figure of merit is first presented. Thereafter, the method of routing table organization and path selection using such multi-costs is provided.

In order to consider multi-costs in a best path determination, a "generally additive operator" must be defined which is not only able to add traditionally (arithmetic) additive cost functions such as delay, monetary cost, and hop count, but which is also able to take into account cost factors which are not additive, such as "available bandwidth", "ability to handle traffic type", etc.

Let A be the range of values associated with a cost function, C. In accordance with the invention, a generally additive operator, $\oplus$, is defined as a mapping of $A \times A \to A$ with properties:

$$a \oplus b = b \oplus a$$

$$(a \oplus b) \oplus c = a \oplus (b \oplus c)$$

for all a, b and c in A.

The standard addition operator, +, on the set of real numbers satisfies this definition. But the $\oplus$ mapping can be satisfied by other operators as well. For example, the min and max functions and the Boolean and operation are just a few of the mappings which satisfy the stated properties in their appropriate domains of definition. The cost functions of "hop count", "delay" and "cost of transmission line facility" are generally additive functions under normal addition. The min function can be applied to the "percent available bandwidth" cost function and the Boolean and function to the "ability to handle traffic type" cost function to make them "generally additive."

Now that the generally additive operator $\oplus$ has been defined, connectivity matrix based single factor cost concepts can be extended to multi-cost functions. Let $\{C_n\}$ be a set of N independent generally additive cost functions. (If there are two cost functions in the sequence that are functionally related, then one of those two can be removed from the sequence.) One way of dealing with the path information is to generate a sequence of connectivity matrixes $\{CM_n\}$, in one-to-one correspondence to the sequence $\{C_n\}$. Then, using traditional routing algorithms, N collections of path-cost information are obtained, each generated from $CM_n$, $1<=n<=N$. However, this collection is not correlated with the collections associated with the other $CM_m$ matrixes, $1<=m<=N$, where $m \ne n$. In effect, the path which might have least cost for cost function $C_n$ is an entirely different path than the one which minimizes the cost function $C_m$. Using this method, there is no obvious way to ensure that the costs associated with all the $\{C_n\}$ cost functions are within acceptable limits simultaneously.

In order to handle the $\{C_n\}$ cost functions applied to the same paths simultaneously, it is observed that since each of the cost functions are independent, their minimum values will not in general be simultaneously achieved when applied to a path which minimizes one of them. Therefore, in accordance with the invention, the relative importance of the various cost functions must be prioritized. Let $\theta(n)$ be an ordering of the indexes such that $\{C_{\theta(n)}\}$ is in priority order. Such an ordering will be called a criterion. There are n! possible criteria derivable from $\{C_n\}$. If two cost functions are of equal importance, they must still be prioritized, making one artificially more important than the other. The n-tuple, $(C_{\theta(1)}, \ldots, C_{\theta(n)})$, is called the composite multi-cost function, denoted by $\tilde{C}$. If two nodes in a network are connected by a link, L, the composite multi-cost function is applicable to the link. Let $\tilde{C}(L)=(d_{\theta(1)}, \ldots, d_{\theta(n)})$ be the composite multi-cost n-tuple of the link, where $d_{\theta(n)}$ is the value of $C_{\theta(n)}$ over the link. Composite multi-cost n-tuples are generally additive using the operator n-tuple, $\oplus = (\oplus_{\theta(1)}, \ldots, \oplus_{\theta(n)})$, each element of the generally additive operator being applied to the corresponding cost function values.

If P is a path in the network from node S to node D, through intermediate nodes, E, F, G, then the value of $\tilde{C}(P)$ is:

$$\tilde{C}(S,E) \oplus \tilde{C}(E,F) \oplus \tilde{c}(F,G) \oplus \tilde{C}(G,D)$$

where the $\tilde{C}(S,E)$, $\tilde{C}(E,F)$, $\tilde{C}(F,G)$ and $\tilde{C}(G,D)$ are the multicost n-tuples of the links found in the CM between adjacent nodes S to E, E to F, F to G, G to D, respectively. In similar manner, the composite multicost of any network path may be obtained by applying the generally additive operator to the inter-nodal multi-cost values as found in the CM for the network.

An ordering is defined for each of the cost function values which make up the composite multi-cost n-tuples. In order to find the "best" path in the network between two nodes S and D in a multi-cost environment, it is necessary to be able to compare multi-cost n-tuples. Let $(a_1, \ldots, a_n)$ and $(b_1, \ldots, b_n)$ be two multi-cost n-tuples. The composite multi-cost $(a_1, \ldots, a_n)$ is greater than (>) $(b_1, \ldots, b_n)$ if:

(1) there is an M, $1<=M<=n$, such that for $0<=i<M$, either i is 0 or $a_i=b_i$, and $a_M=b_M$;

If:

(2) $a_i=b_i$ for $1<=i<=n$, then $(a_1, \ldots, a_n)$ is equal to (=) $(b_1, \ldots, b_n)$.

If neither of these two possibilities hold, then the composite multi-cost $(a_1, \ldots, a_n)$ is less than (<) $(b_1, \ldots, b_n)$. A path P1 from node S to node D is the shortest path if for every path P2 between these two nodes, $\tilde{C}(P1)<=\tilde{C}(P2)$, where the length of a path is defined as the composite multi-cost n-tuple taking the generally additive sum of the composite multi-cost n-tuples of the individual links which make up the path.

Using the above definitions, single cost CM-based "shortest path algorithms" immediately extend to the multi-cost function environment.

The operation of the invention is best understood by example. Consider a virtual private network (VPN) as depicted in FIG. 1. Referring to FIG. 1, the bold lines exemplify links which can carry VPN traffic (VPNL) while the lighter lines exemplify links which cannot carry VPN traffic (L). Assume that the cost of paths are to be evaluated by two cost functions: (1) inability to carry VPN traffic (V); and (2) transmission cost (T). For "transmission cost" the normal addition operator will serve as the additive operator. For "inability to carry VPN traffic" there is a normal Boolean cost associated with each link: 1 if it cannot support VPN traffic and 0 if it can support VPN traffic. The or Boolean operator, (+), is chosen as the generally additive operator.

Figure 2:
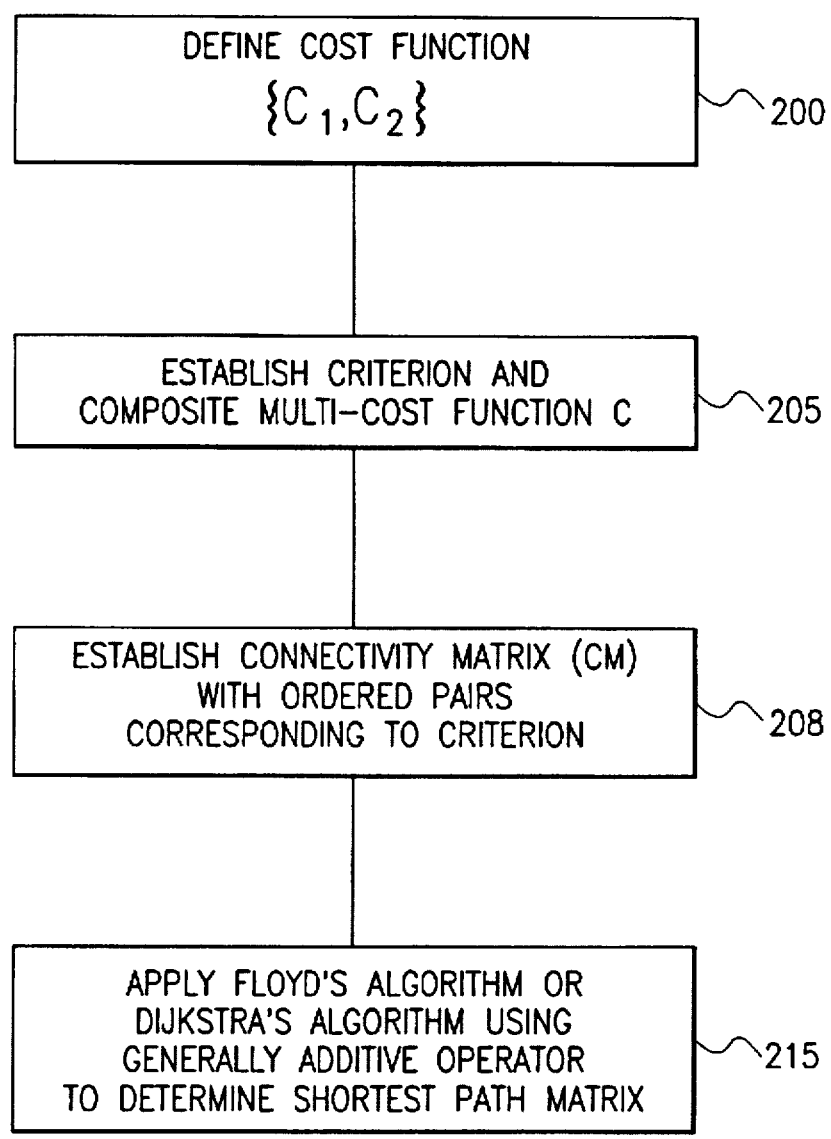
FIG. 2 is a logic flow diagram of a shortest path determination for the virtual private network of FIG. 1 utilizing connectivity matrix-based multi-cost routing.

In order to make a shortest path or best path determination for the virtual private network of FIG. 1, the steps shown in the logic flow diagram of FIG. 2 are used. Referring to FIG. 2, in step 200, the cost functions $\{C_1, C_2\}$ to be applied to the virtual private network are defined. As discussed above, with respect to the virtual private network of FIG. 1, the cost functions of concern are the inability to carry VPN traffic (V) and the transmission costs (T).

Next, in step 205, the criterion $\theta(2)$ is established wherein the cost functions $\{C_1, C_2\}$ are prioritized. For example, with respect to FIG. 1, suppose that the "inability to carry VPN traffic" is the most important link characteristic. Then V will have a higher priority than T. Therefore, as described above, using the cost functions $\{C_1, C_2\}$ and the criterion $\theta(2)$, the composite multi-cost function, $\tilde{C}$, is established.

After the criterion is established, a connectivity matrix for the network is established, in a step 208, having ordered pairs which correspond to the priority established by the criterion. For example, in the virtual private network of FIG. 1, the CM is a 6×6 matrix of ordered pairs, (v,t), where v is the link cost with respect to the V cost function and t is the link cost with respect to the T cost function. Using the link cost ordered pairs of FIG. 1, the CM is:

|     |   | 1 | 2 | 3 | 4 | 5 | 6 |   |
|-----|---|---|---|---|---|---|---|---|
| S 1 | [ | (φ,φ) | (0,1) | (∞,∞) | (∞,∞) | (∞,∞) | (1,1) | ] |
| O 2 |   | (0,1) | (φ,φ) | (0,3) | (1,1) | (∞,∞) | (∞,∞) |   |
| U 3 |   | (∞,∞) | (0,3) | (φ,φ) | (0,2) | (1,1) | (∞,∞) |   |
| R 4 |   | (∞,∞) | (1,1) | (0,2) | (φ,φ) | (1,2) | (0,3) |   |
| C 5 |   | (∞,∞) | (∞,∞) | (1,1) | (1,2) | (φ,φ) | (1,1) |   |
| E 6 |   | (1,1) | (∞,∞) | (∞,∞) | (0,3) | (1,1) | (φ,φ) |   |
|     |   | 1 | 2 | 3 | 4 | 5 | 6 |   |
|     |   | | | DESTINATION | | | |   | where (φ, φ) implies that a node is the shortest path to itself, and (∞, ∞) implies that there is no direct connectivity between the source and destination nodes.

Finally, in the step 215, the resulting shortest path matrix, obtained by applying Floyd's Algorithm to the CM, is:

|     |   | 1 | 2 | 3 | 4 | 5 | 6 |   |
|-----|---|---|---|---|---|---|---|---|
| S 1 | [ | (φ,φ) | (0,1) | (0,4) | (0,6) | (1,5) | (0,9) | ] |
| O 2 |   | (0,1) | (φ,φ) | (0,3) | (0,5) | (1,4) | (0,8) |   |
| U 3 |   | (0,4) | (0,3) | (φ,φ) | (0,2) | (1,1) | (0,5) |   |
| R 4 |   | (0,6) | (0,5) | (0,2) | (φ,φ) | (1,2) | (0,3) |   |
| C 5 |   | (1,5) | (1,4) | (1,1) | (1,2) | (φ,φ) | (1,1) |   |
| E 6 |   | (0,9) | (0,8) | (0,5) | (0,3) | (1,1) | (φ,φ) |   |
|     |   | 1 | 2 | 3 | 4 | 5 | 6 |   |
|     |   | | | DESTINATION | | | |   |

The above shortest path matrix represents the shortest path from any source node to any destination node favoring VPN links over links not permitted to carry VPN traffic. From the standpoint of the VPN, this matrix represents the shortest path available between any source and destination nodes reachable by use of VPN links only. It is clear that certain source and destination nodes are not reachable within the VPN (e.g., node 3 cannot reach node 5). However, this matrix permits the accurate selection of paths which remain within the VPN between any source and destination connected through use of VPN links. It also permits the selection of a path to a non-VPN node which stays within the VPN until it reaches the closest node to the ultimate destination node reachable using only VPN links (e.g., the path from node 2 to node 5). Thus, traffic generated by subscribers of the VPN will use VPN resources as much as possible even when accessing network ports outside of its domain As will be understood, the shortest path composite multi-cost value taken from the above shortest path matrix between a source and destination node pair is not necessarily minimal in the "transmission cost" cost function. However, given the chosen cost function priorities, the composite multi-cost function minimizes the cost function selected as being most important. For non-VPN traffic, this matrix does not in general yield the shortest path since all links (including those which carry VPN traffic) can be used in the path selection criteria.

Figure 3:
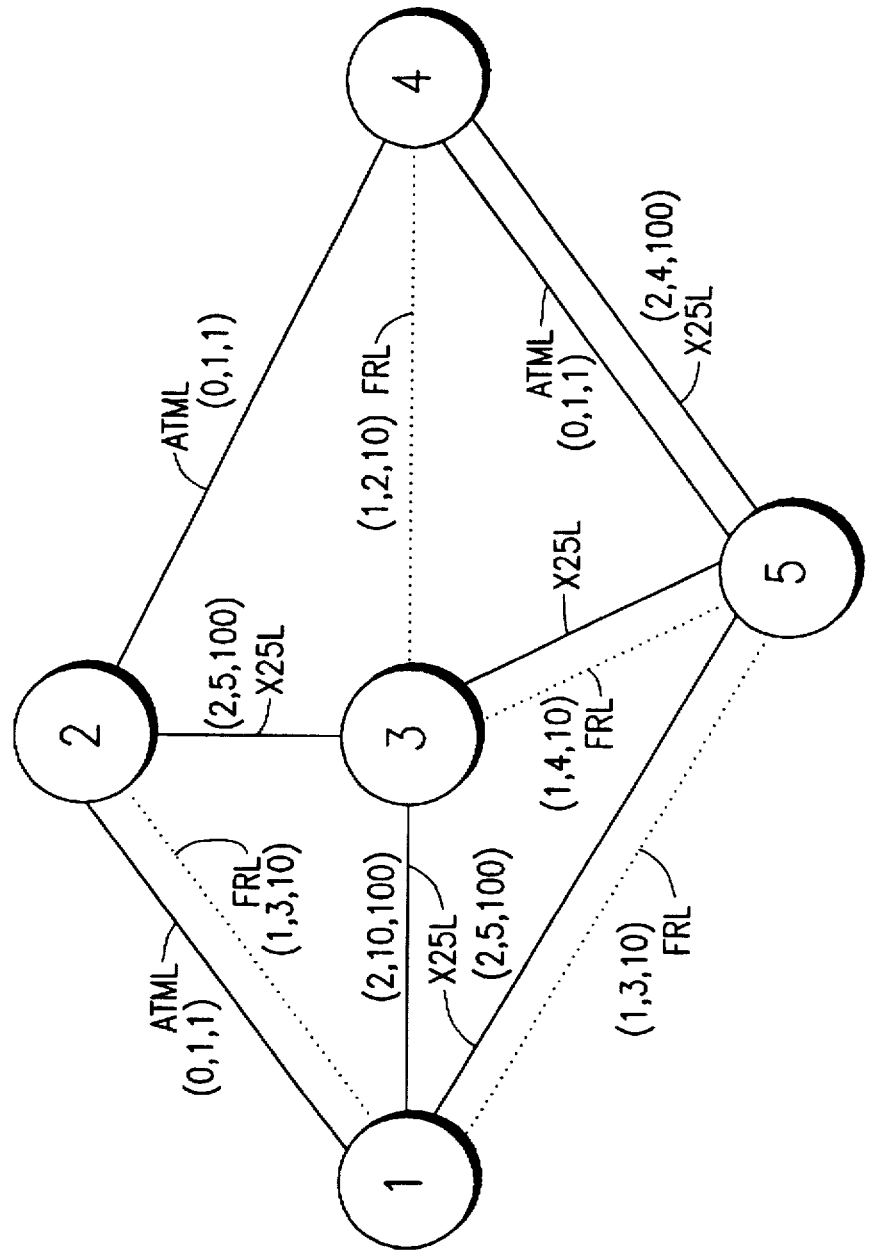
FIG. 3 is a schematic diagram of a second network example, including three cost functions, utilizing connectivity matrix-based multi-cost routing in accordance with the invention.

FIG. 3 provides a second network example including three cost functions. Referring to FIG. 3, the network has its network elements connected by links which can support various services: X.25; Frame Relay; and ATM. Suppose that X.25 traffic should traverse X.25 links (X25L) whenever possible, using Frame Relay links (FRL) as an alternative of choice and ATM links (ATML) only when there is no other choice. In addition, suppose, that Frame Relay traffic cannot be carried by X.25 links and should use Frame Relay links in preference to ATM links wherever possible. ATM traffic may only use ATM links. Finally, in order that performance be within specification, no path is to take any more than 9 hops between source and destination. Within this selection scheme, suppose that delay is to be minimized, with hop count as the third priority selection criterion. Each trunk has an associated triple of numbers (a,b,c) where a is the rank, in inverse order, of the link type with respect to its usability, b is the delay in milliseconds, and c is the hop count. Considering the network with respect to ATM service, the link type is defined as follows: a=0 for ATM; a=1 for Frame Relay; and a=2 for X.25.

The CM for a particular service is formulated as follows. First, if two nodes are connected to each other by one or more links, choose the link with the lowest 'a' value with respect to the specific service (e.g., for ATM service, choose the ATM link between nodes 1 and 2 and the Frame Relay link between nodes 1 and 5). Next, assign a triple (a,b,c) for each link selected. In order to easily identify how many hops of each type of link are in any path, a weighted hop count value is used for each type of line such that the resulting total weighted hops in a path can be decomposed, much as a decimal number, into its constituent hops. Since no path can have more than 9 hops, weighted hops of 1, 10 and 100 were chosen for ATM, Frame Relay and X.25 respectively. (In general, if there were a requirement that no path take more than H hops, then the weights 1, H+1 and (H+1)$^2$ may be used for ATM, Frame Relay and X.25 respectively).

Three CMs are used to describe the link connectivity with respect to each of the supported network services. For the ATM service topology, the CM is given by:

| | 1 | 2 | 3 | 4 | 5 |
|---|---|---|---|---|---|
| S 1 | (φ,φ,φ) | (0,1,1) | (2,10,100) | (∞,∞,∞) | (1,3,10) |
| O 2 | (0,1,1) | (φ,φ,φ) | (2,5,100) | (0,1,1) | (∞,∞,∞) |
| U 3 | (2,10,100) | (2,5,100) | (φ,φ,φ) | (1,2,10) | (1,4,10) |
| R 4 | (∞,∞,∞) | (0,1,1) | (1,2,10) | (φ,φ,φ) | (0,1,1) |
| C 5 | (1,3,10) | (∞,∞,∞) | (1,4,10) | (0,1,1) | (φ,φ,φ) |
| E | | | DESTINATION | | |

The CM is processed using Floyd's Algorithm on this CM using the triple of generally additive operators (max, +,+).

This leads to an ATM service network 'shortest path' matrix (SPM) of:

| | 1 | 2 | 3 | 4 | 5 |
|---|---|---|---|---|---|
| S 1 | (φ,φ,φ) | (0,1,1) | (1,4,12) | (0,2,2) | (0,3,3) |
| O 2 | (0,1,1) | (φ,φ,φ) | (1,3,11) | (0,1,1) | (0,2,2) |
| U 3 | (1,4,12) | (1,3,11) | (φ,φ,φ) | (1,2,10) | (1,3,11) |
| R 4 | (0,2,2) | (0,1,1) | (1,2,10) | (φ,φ,φ) | (0,1,1) |
| C 5 | (0,3,3) | (0,2,2) | (1,3,11) | (0,1,1) | (φ,φ,φ) |
| E | | | DESTINATION | | |

The first element of each triple in the matrix represents the code of the least acceptable protocol used in the path for the service network. The second element represents the total delay associated with the links in the path. The third element is the weighted hop count of the path. Its value provides sufficient information to decompose the path into its constituent link types (e.g., a weighted hop count of 12 implies a unique decomposition of 1 hop of weight 10 and two hops of weight 1 which implies two ATM hops and one Frame Relay hop).

There are certain nodes that cannot be reached by a purely ATM service. For example, SPM[3,2] is (1,3,11). This means that path contains a Frame Relay link. Since this is the best path from node 3 to node 2, it follows that the ATM service is insufficient to handle any requirement for ATM traffic between these two nodes.

The ATM service network 'shortest path' matrix also indicates that there is always a path for X.25 traffic and Frame Relay traffic between any two nodes. Since there is no absolute prohibition from using ATM and/or Frame Relay links from carrying X.25 service, there is always X.25 connectivity between any two nodes. However, the objective is to carry X.25 traffic over pure X.25 links if at all possible. Thus, although this matrix is sufficient to handle, totally, the determination of the best path for ATM service, it is insufficient, by itself, for determining the 'best' paths for all services.

When this same network is considered with respect to the Frame Relay service, the most desirable links are those with Frame Relay protocol, so they are given the link protocol value (a) of 0. The next most desirable links are those carrying ATM. So such links have a protocol value of 1. Last, since X.25 links are not acceptable for Frame Relay traffic, these links are given a protocol value of 2.

The resultant FR connectivity matrix is given by:

| | 1 | 2 | 3 | 4 | 5 |
|---|---|---|---|---|---|
| S 1 | (φ,φ,φ) | (0,3,10) | (2,10,100) | (∞,∞,∞) | (0,3,10) |
| O 2 | (0,3,10) | (φ,φ,φ) | (2,5,100) | (1,1,1) | (∞,∞,∞) |
| U 3 | (2,10,100) | (2,5,100) | (φ,φ,φ) | (0,2,10) | (0,4,10) |
| R 4 | (∞,∞,∞) | (1,1,1) | (0,2,10) | (φ,φ,φ) | (1,1,1) |
| C 5 | (0,3,10) | (∞,∞,∞) | (0,4,10) | (1,1,1) | (φ,φ,φ) |
| E | | | DESTINATION | | |

Applying Floyd's algorithm to the FR connectivity matrix using the generally additive operator (max,+,+) obtains the following FR shortest path matrix.

| | 1 | 2 | 3 | 4 | 5 |
|---|---|---|---|---|---|
| S 1 | (φ,φ,φ) | (0,3,10) | (0,7,20) | (0,9,30) | (0,3,10) |
| O 2 | (0,3,10) | (φ,φ,φ) | (0,10,30) | (0,12,40) | (0,6,20) |
| U 3 | (0,7,20) | (0,10,30) | (φ,φ,φ) | (0,2,10) | (0,4,10) |
| R 4 | (0,9,30) | (0,12,40) | (0,2,10) | (φ,φ,φ) | (0,6,20) |
| C 5 | (0,3,10) | (0,6,20) | (0,4,10) | (0,6,20) | (φ,φ,φ) |
| E | | | DESTINATION | | |

The connectivity of the network is such that Frame Relay traffic follows paths using Frame Relay links. These paths are neither optimal in terms of delay nor hops. But for the Frame Relay traffic they represent the least delay Frame Relay paths within the network. Had there been several Frame Relay paths of equal delay between two nodes, then the hop count would have been a factor in determining the best path.

To handle the X.25 service aspects, the CM is generated from the X.25 protocol perspective. Here, X.25 links are the best to use, followed by Frame Relay and then by ATM. In this case, X.25 links are given a protocol value of 0, while Frame Relay links and ATM links have protocol values of 1 and 2, respectively. The appropriate connectivity matrix for the X.25 service network is:

| S 1 | | $(\phi,\phi,\phi)$ | (1,3,10) | (0,10,100) | $(\infty,\infty,\infty)$ | (0,5,100) | |
|---|---|---|---|---|---|---|---|
| O 2 | ⎡ | (1,3,10) | $(\phi,\phi,\phi)$ | (0,5,100) | (2,1,1) | $(\infty,\infty,\infty)$ | ⎤ |
| U 3 | | (0,10,100) | (0,5,100) | $(\phi,\phi,\phi)$ | (1,2,10) | (0,5,100) | |
| R 4 | | $(\infty,\infty,\infty)$ | (2,1,1) | (1,2,10) | $(\phi,\phi,\phi)$ | (0,4,100) | |
| C 5 | ⎣ | (0,5,100) | $(\infty,\infty,\infty)$ | (0,5,100) | (0,4,100) | $(\phi,\phi,\phi)$ | ⎦ |
| E | | 1 | 2 | 3 | 4 | 5 | |
| | | | | DESTINATION | | | |

Applying Floyd's algorithm, using the generally additive triple (max,+,+), obtains the X.25 service 'shortest path' matrix of:

| S 1 | | $(\phi,\phi,\phi)$ | (0,15,200) | (0,10,200) | (0,9,200) | (0,5,100) | |
|---|---|---|---|---|---|---|---|
| O 2 | ⎡ | (0,15,200) | $(\phi,\phi,\phi)$ | (0,5,100) | (0,14,300) | (0,10,200) | ⎤ |
| U 3 | | (0,10,100) | (0,5,100) | $(\phi,\phi,\phi)$ | (0,9,200) | (0,5,100) | |
| R 4 | | (0,9,200) | (0,14,300) | (0,9,200) | $(\phi,\phi,\phi)$ | (0,4,100) | |
| C 5 | ⎣ | (0,5,100) | (0,10,200) | (0,5,100) | (0,4,100) | $(\phi,\phi,\phi)$ | ⎦ |
| E | | 1 | 2 | 3 | 4 | 5 | |
| | | | | DESTINATION | | | |

The X.25 "shortest path" matrix indicates that all nodes can be reached by paths which use exclusively X.25 links. This is not to say that the delay, nor hop count are minimized by such paths. But the paths do minimize delay within the X.25 service network, in preference to nodal hops.

Figure 4:
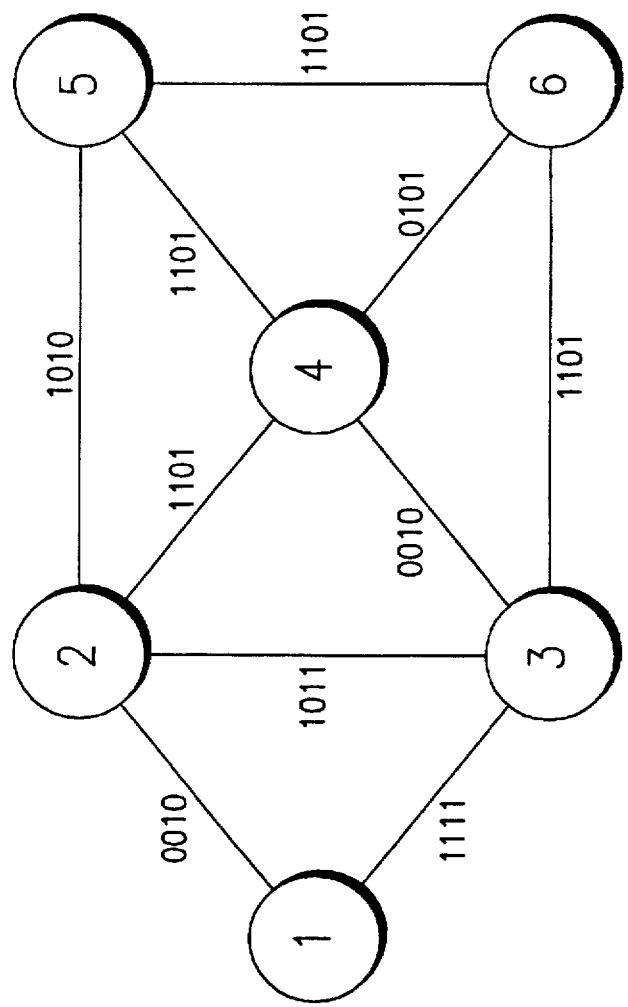
FIG. 4 is a schematic diagram of a third network example utilizing connectivity matrix-based multi-cost routing in accordance with the invention and illustrating the use of a Mask function (M) to define a required functionality.

FIG. 4 is a third network example. Referring to FIG. 4, the network links support a collection of functions of importance to the subscribers of the network. A particular path in such a network is to be chosen according to the functions required by the call as far as possible while minimizing the hop count within the network. The network of FIG. 4 supports some or all of the following functionality: (a) security of data transmission (e.g., ability to handle classified data); (b) path diversity (e.g., the underlying bearer has multiple paths leading to high link reliability); (c) fiber transmission medium (e.g., for low Bit Error Rate); and (d) bandwidth-on-demand (e.g., for multi-media applications). Each link has an associated 4-tuple with 1s and 0s indicating the presence or absence of the functionality in the order indicated by the bullets (a) (d).

In such a network, given a subset of the supported link-based functionality, it is reasonable to determine the best path capabilities available in the network as an aid to locating path deficiencies which must be corrected in order to provide the necessary network support. It may not be necessary that paths be found from a fixed source node to the other potential destination nodes which satisfy all the supported functions simultaneously. As an illustration of how these services are distributed, consider the determination of possible best connectivity for the subset of functions consisting simultaneously of 'path diversity' and 'bandwidth-on-demand'. Additionally, the least hop routing is determined within the constraints that the selected paths are the best at meeting the desired functionality. To perform this task, the network is considered as being described by a 2-tuple cost function, (s,h), where s is a subset of the supported network functions and h is the hop count of the corresponding path. The generally additive operator on this cost 2-tuple is (mand,+), where MAND refers to a masked boolean MAND and '+' is normal arithmetic addition. If $(s_1,h_1)$ and $(s_2,h_2)$ are 2-tuples, then $(s_1,h_1) \oplus (s_2,h_2)$ is $(s_1$ MAND $s_2, h_1+h_2)$.

The following example illustrates the application of MAND to a pair of Boolean strings using the generally additive operator. Let $s_1$ and $s_2$ be two Boolean strings of equal length and M be the mask of the same length of desired/required functionality associated with the Boolean strings. Then $s_1=s_2$ with respect to M, if $s_1*M=s_2*M=(s_1+s_2)*M$ or $s_1*M \neq s_2*M \neq (s_1+s_2)*M$ (where "+" is the Boolean "or" function and "*" is the Boolean "and" function). Otherwise, we say either $s_1<s_2$ or $s_2<s_1$, meaning either $s_1*M=(s_1+s_2)*M$ or $s_2*M=(s_1+s_2)*M$, respectively. Then the term "less than or equal ($\leq$)" is a well ordering on the masked Boolean strings, i.e., given any two Boolean strings of equal length and a mask M of the same length, then either the two strings are equal or one string is less than the other. If $s*M=0$, the $s \geq$ all other Boolean strings of equal length to that of the mask M.

We define $s_1 \oplus s_2$ with respect to mask M to be $s_1*s_2*M$, the MAND of $s_1$ and $s_2$.

With the above example in mind, and returning to the example of FIG. 4. Let M be the mask of the required functionality (e.g., M is 0101 for this illustration). With these definitions, it is now possible to apply the multiple cost approach to determine the 'shortest paths' relative to the network with respect to a mask of functionality, M. The CM for this network is:

|   |   | 1 | 2 | 3 | 4 | 5 | 6 |
|---|---|---|---|---|---|---|---|
| S | 1 | (φ,φ) | (0010,1) | (1111,1) | (∞,∞) | (∞,∞) | (∞,∞) |
| O | 2 | (0010,1) | (φ,φ) | (1011,1) | (1101,1) | (1010,1) | (0,∞) |
| U | 3 | (1111,1) | (1011,1) | (φ,φ) | (0010,1) | (∞,∞) | (1101,1) |
| R | 4 | (∞,∞) | (1101,1) | (0010,1) | (φ,φ) | (1101,1) | (0101,1) |
| C | 5 | (∞,∞) | (1010,1) | (∞,∞) | (1101,1) | (φ,φ) | (1101,1) |
| E | 6 | (∞,∞) | (∞,∞) | (1101,1) | (0101,1) | (1101,1) | (φ,φ) |
|   |   |   |   | DESTINATION |   |   |   | where (∞, ∞) implies the absence of direct node-to-node connectivity. The 'shortest path' matrix with respect to the mask-defined functionality is thus:

|   |   | 1 | 2 | 3 | 4 | 5 | 6 |
|---|---|---|---|---|---|---|---|
| S | 1 | (φ,φ) | (0101,4) | (1111,1) | (0101,3) | (1101,3) | (1101,2) |
| O | 2 | (0101,4) | (φ,φ) | (0101,3) | (1101,1) | (1101,2) | (0101,2) |
| U | 3 | (1111,1) | 0101,3) | (φ,φ) | (0101,2) | (1101,2) | (1101,1) |
| R | 4 | (0101,3) | (1101,1) | (0101,2) | (φ,φ) | (1101,1) | (0101,1) |
| C | 5 | (1101,3) | (1101,2) | (1101,2) | (1101,1) | (φ,φ) | (1101,1) |
| E | 6 | (1101,2) | (0101,2) | (1101,1) | (0101,1) | (1101,1) | (φ,φ) |
|   |   |   |   | DESTINATION |   |   |   |

The 'shortest path' between any two nodes is seen to be the least hop path which includes the desired services. It is clear that there may be no path between some of the nodes for certain choices of the mask. M. Consider, for example, the path from node 1 to node 6 with respect to the functionality 'fiber transmission medium'. Although there are parts of paths which have the desired medium, there is always at least one link which does not possess a fiber transmission medium.

In single-cost shortest path algorithms, the idea of a minimal, least, or "shortest" path is intuitively clear. If the cost of a path is least compared to all other paths, it is the shortest path. It would be ideal if this same concept carried directly to a multiple cost shortest path algorithm. Unfortunately, the generalization rarely holds in practice. For, the generalization requires the simultaneous minimization of the individual costs of the multi-cost function, a condition much stronger than insisting on a single-cost obtaining its minimum. In common situations, additive cost functions comprising multi-cost criteria are completely unrelated, (e.g., hop count, monetary cost of transmission lines). It is quite possible that the minimization of one is unrelated to the minimum of another. When generally additive cost functions form part or all of a multi-cost function, there is even less predictability as to whether all the individual cost functions will achieve a minimum simultaneously.

With multiple cost components, the term "minimum cost" implies that the most significant cost function is minimal and that for this minimal value, the other cost functions are the smallest possible given the cost ordering. In effect, each component cost (excluding the most significant cost component) could achieve an individually lower value than is found in the "minimal cost" of the multi-cost function.

Figure 5:
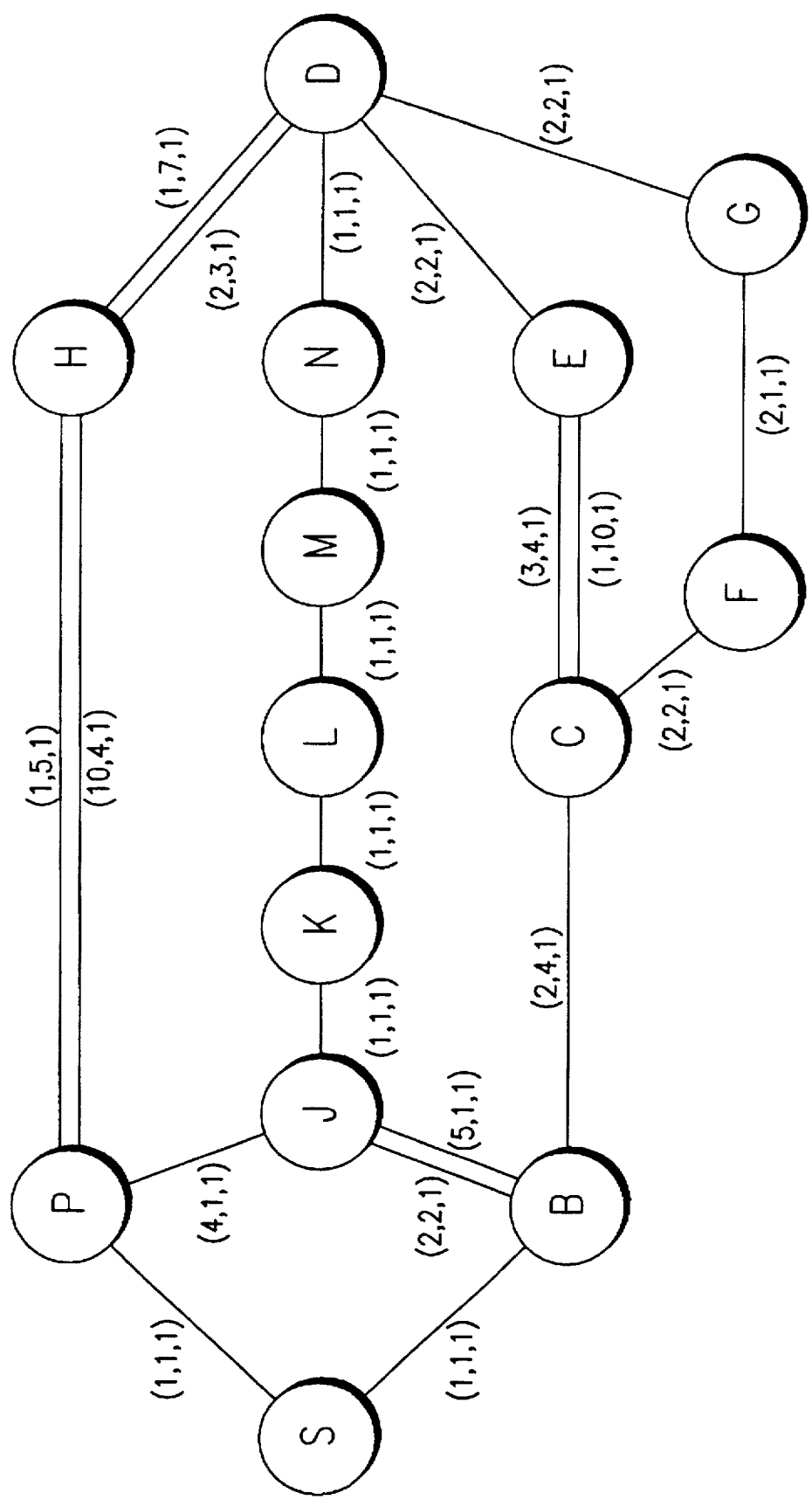
FIG. 5 is a schematic diagram of a fourth network example utilizing connectivity matrix-based multi-cost routing in accordance with the invention and illustrating a correcting method to find a path meeting a given call criterion.

The "minimum cost" has a profound impact on the ability of Floyd's Algorithm or Dijkstra's Algorithm to provide sufficient information to allow a path to be found between two nodes in a multi-cost network. This concept can best be explained with reference to the network of FIG. 5. Referring to FIG. 5, the ordered triples represent the additive multi-cost functions, ($,d,h), where '$' represents monetary cost, 'd' denotes propagation delay and 'h' indicates hop count. Using the tri-cost criterion of "monetary cost is more important than propagation delay which is more important than hop count", a "minimal cost" is obtained from node S to node D of value (3,13,3) found by taking the path S-P-H-D. Conversely, considering the criterion of "propagation delay followed by monetary cost followed by hops", a "minimal cost" is obtained of value (10,7,7) via the path S-P-J-K-L-M-N-D. Note that the absolute minimum monetary cost and hop count cost is found in the path S-P-H-D where each has value 3. The absolute minimal delay path is S-P-J-K-L-M-N-D with value 7. For this path, the monetary cost is 10 and the hop count is 7. There are four other possibilities for ordering the tri-cost functions. For example, there is the criterion of "delay followed by hops followed by monetary costs". In this case, the "minimal cost" path for this criterion is again S-P-J-K-L-M-N-D.

Note that if there are N independent cost functions comprising a multi-cost function, then there are N! possible multi-cost criteria. It becomes impractical to deal with all of these. Instead, a selected subset of the possible criteria may be considered as a basis for network routing. However, even if all N! possible criteria are used to calculate "shortest path" routes between two nodes, there is no guarantee that any of these will satisfy the requirements of routing a specific call requiring a specific combination of the multiple costs.

Using the network of FIG. 5, assume that it is desirable to route a call from S to D with a monetary cost of no more than 9, no more that 5 hops and no more than 9 units of delay. There is indeed such a path, namely S-B-C-F-G-D. If each of the possible six criteria are applied to the network, there are none whose corresponding shortest path from S to D ensures that the three metrics of the call can be satisfied simultaneously. The two criteria which minimize monetary cost first yield identical shortest path metrics of (3, 13, 3). The two criteria which minimize hop count first yield shortest path metrics of (3 13, 3) and (13, 8, 3). Finally, the two criteria which minimize delay first result in the same shortest path metrics of (10, 7, 7). It follows that the delay metric is the problem. It does not achieve its minimum along the same path as the simultaneous minimums of hop count and monetary cost. The desired call metrics are distributed such that when the other two metrics can be achieved, the delay metric appears to be unachievable. Conversely, when a criterion is chosen such that the required delay metric is met, then the monetary cost and hop count metrics are too high.

The example of FIG. 5 illustrates the limitations of multi-cost routing choices and the associated path selection process. Even when paths exist in the network which satisfy the multi-cost requirements of a particular call, the multi-cost values associated with the "shortest paths" may mask this information so that there appears to be no possible path. Although there is no absolute guarantee that multi-cost routing information will ensure a path for a given call requiring conformance to specific multi-cost metrics, a correcting method in accordance with the invention improves the multi-cost information and gives the best chance for successfully finding a path.

For purposes of illustrating the correcting method of the invention, let CM(C) be the connectivity matrix of any network with respect to a given criterion, C, with ordered component cost functions $c_1, c_2, \ldots, c_N$. Then CM(C) [i,j] has n-tuple, $(c_1, C_2, \ldots, c_N)$, of values appropriate to a multi-cost link between adjacent nodes i and J. In case there are multiple links between two adjacent nodes, the one with the lowest multi-cost, according to C is selected for CM(C). The criterion cost $(E_1, E_2, \ldots, E_N)$, between a source node S and a destination node D with respect to the criterion C is just the value obtained by applying Floyd's Algorithm or Dijkstra's Algorithm to CM(C) for the "least cost" of a path between the two nodes with respect to C.

Now consider each individual cost function $c_i$, $1 \leq i \leq N$, which is a component of C. Apply Floyd's Algorithm or Dijkstra's Algorithm to CM(C) considering only the i-th member of each N-tuple, i.e., obtain the single-cost "least cost" of a path between a source node S and a destination node D with respect to $c_i$ relative to criterion C. This cost will be called the i-th constraint cost, $e_i$, between the two nodes. The total set of the N constraint costs $e_i$, $1 \leq i \leq N$, can be used to form an N-tuple $(e_1, e_2, \ldots, e_N)$ defined as the composite constraint multi-cost between nodes S and node D.

Since the composite constraint multi-cost is composed of the individual least costs of each component without regard for the effects of the criterion C, it follows that $(e_1, e_2, \ldots, e_N) \leq (E_1, E_2, \ldots, E_N)$ for the two nodes, S and D. Since $c_1$ is the most significant cost component of C, it follows that $E_1 = e_1$. If all of the individual cost functions, $c_i$, simultaneously attain their minimums along the same path from node S to node D, then $E_i = e_i$, $1 \leq i \leq N$. Any other situation will result in at least one value of i, $2 \leq i \leq N$, with $e_i < E_i$.

Considering the criterion, C, having N independent cost functions, $c_1, c_2, \ldots, c_N$, if there is a link from node A to node B, the cost of that link may be low for $c_i$, but high for $c_j$. There may be other nodes, node F and node G, where the reverse is true. Alternatively, there may be multiple links between node A and node B. In this case, the choice of link for $c_i$ may be different from the choice of link for $c_j$ with the intent that the selected link has the minimum cost for the given cost function. This principle is illustrated in FIGS. 6a and 6b for a pair of cost functions.

Referring to FIGS. 6a and 6b, it is assumed that there are two cost functions $c_1$ and $c_2$ and the multi-costs of links are given as ordered pairs $(c_1, c_2)$ FIG. 6a illustrates the point that a path with a low cost value for $c_1$ may be entirely different from a path with a low cost value for $c_2$. FIG. 6b indicates that even when paths for each of the cost functions include the same nodes, they may require different links for achieving individual minimal costs. Therefore, there may not be a consistent choice of links which will simultaneously minimize $c_1$ and $c_2$.

Returning to the consideration of N independent cost functions, and generalizing the information illustrated by FIG. 5, it follows that each independent cost function, $c_i$, $1 \leq i \leq N$, must have its own connectivity matrix $CM(c_i)$, where the cost assigned to a connecting link between two nodes is chosen to have the minimal value for $c_i$. It follows that $CM(c_i)$ may differ significantly from $CM(c_j)$ for some other cost function. Connectivity matrix $CM(c_i)$ is used to find the absolute minimal cost path for the i-th cost function $c_i$ between any two nodes in the network. Let $ae_i$ be the minimal cost path with respect to the cost function $c_i$. Then an absolute constraint cost $(ae_1, ae_2, \ldots, ae_N)$ is defined such that $ae_i \leq e_i \leq E_i$, $1 \leq i \leq N$, for all criteria C, composed of the cost functions.

The criterion cost, absolute constraint cost and composite constraint cost can be used to define "primary" and "secondary" paths within the network. For example, let S be any node in a network. Let $A = \{A_k\}$, $1 \leq k \leq m$, be the set of all nodes of the network directly connected to node S by either single or multiple links. Let SCM(C) be CM(C) with all link connectivity from node S to A removed. In effect, SCM(C) isolates node S so that it cannot be part of any path from any $A_k \in A$ to any other destination node D (where node D is different from node S) in the network. Using SCM(C) and applying Floyd's Algorithm (or Dijkstra's Algorithm) for each $A_k \in A$, a determination may be made of the criterion cost, $E_k = (E_1, E_2, \ldots, E_N)_k$, and the composite constraint cost, $e_k = (e_1, e_2, \ldots, e_N)_k$, from each source node $A_k \in A$ to every destination node D. The sets $\{E_k\}$ and $\{e_k\}$ form m n-tuples of multi-costs, each n-tuple associated with an adjacent node of node S (and not including S as described above).

To find the cost of a path from node S to node D, it is observed that any such path must transit through one of the adjacent nodes $A_k \in A$. A link "least-criterion-cost" ("composite-constraint-cost", "absolute-constraint-cost") of the path to node D through node $A_k$ is defined as the sum of the multi-cost of the chosen link from node S to node $A_k$ and the criterion cost (composite-constraint-cost, absolute-constraint-cost) of the path from $A_k$ to the destination node D. A link least criterion-cost (composite-constraint-cost, absolute-constraint-cost) of a path from node S to destination node D through node $A_k$ (according to criterion C) is defined as the sum of the cost of a multi-cost link from node S to node $A_k$ and the criterion cost (composite-constraint-cost, absolute-constraint-cost) from $A_k$ to node D. By considering all the different link least-criterion-costs from node S to each of the adjacent nodes $A_k$, $1 \leq k \leq m$, the resultant link least-criterion-costs from node S through node D can be ordered. If two or more such costs have the same value, then the corresponding link composite-constraint-costs are compared and used to determine the ordering. The link(s) with the lowest link least-criterion-costs are called the primary link(s). The corresponding adjacent node(s), $A_k$, is called the primary adjacent node(s). The remaining ordered link least-criterion-costs of paths, if any, are the secondary links. Throughout the remainder, it is assumed that a given node routes a call to one of its adjacent nodes. Once there, that node routes it in exactly the same manner, continuing until the destination node is reached. Thus, from the standpoint of a node, primary links are synonymous with primary paths and secondary links are synonymous with secondary paths. The set of primary paths and secondary paths associated with each destination node D forms the routing choices for the node S.

Figure 7:
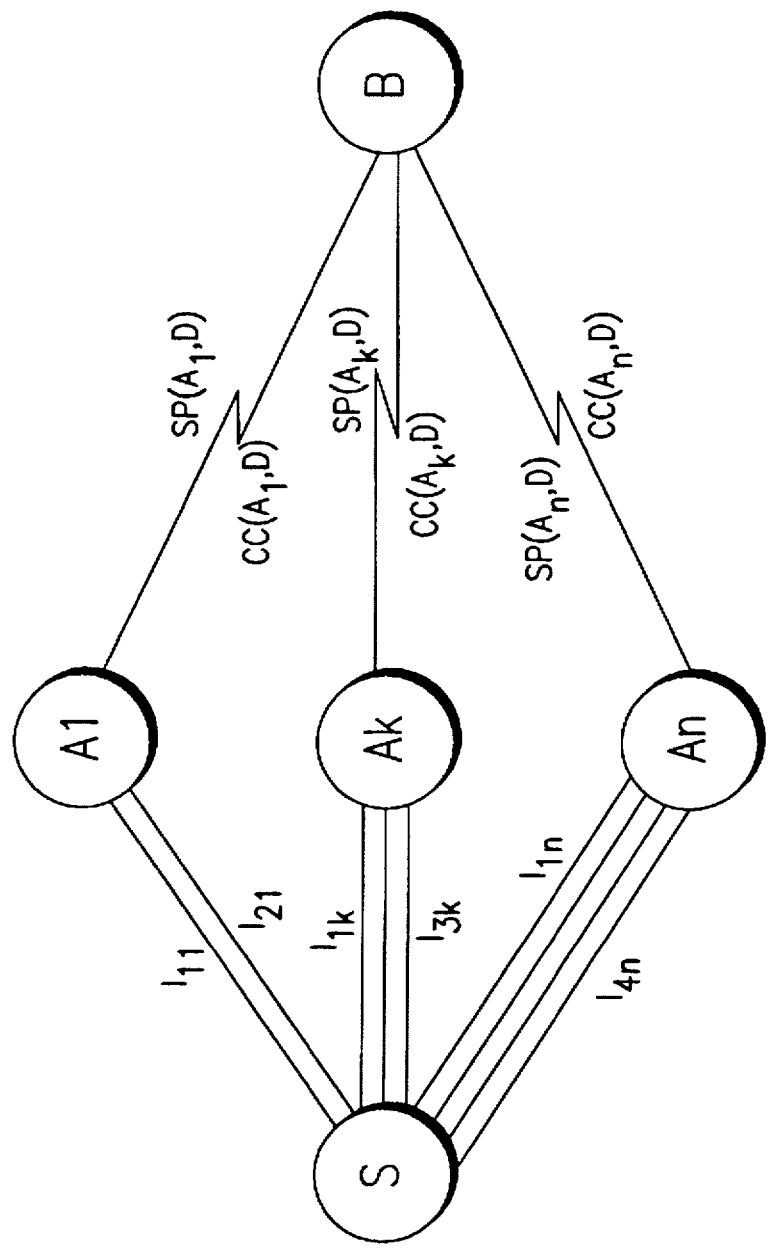
FIG. 7 is a schematic diagram of a fifth network example illustrating the determination of a conceptual routing table from a source node (S) to a destination node (D)

Using the above definition, a routing table can be defined for a path selection from a source node (S) to a destination node (D). Referring to the example of FIG. 7, let C be a criterion of m multi-cost functions $(c_1, c_2, \ldots, c_m)$. Let S be the node for which routing tables are being generated. Let D be any destination node in the network. The set $\{A_k\}$, $1 <= k <= n$, is the set of all network nodes that are link-connected (adjacent) to S.

Let CM(C) be the multi-cost connectivity matrix for the network. Let SCM(C) be the associated connectivity matrix at node S wherein all connectivity between node S and its adjacent nodes are removed (i.e., S is isolated from the connectivity in the network). SCM(C) is used to find the shortest path from each adjacent node $A_k$ to the destination node D for criterion C. This least multicost path is denoted by $SP(A_k, D)$, $1 <= k <= n$. Let $CC(A_k, D)$ be the constraint cost of each path from $A_k$ to D. It is noted that since SCM(C) has node S isolated from the rest of the network. SP($A_k$,D) and CC($A_k$,D) do not involve any paths which go through S.

Suppose there are q(k) links from S to adjacent node $A_k$. Let $L_j(S,A_k)$, $1 \leq j \leq q(k)$, be the link multi-cost of each of the links. l(j). Let $R_{jk}(D)$ be the ordered triple ($S_{jk}$, $U_{jk}(D)$, $B_{jk}(D)$), where $R_{jk}(D)$ is the j-th routing entry associated with the j-th link from S to $A_k$. $S_{jk}$ is the link identifier of the j-th link from S to $A_k$. $U_{jk}(D)=L_j(S,A_k) \oplus SP(A_k,D)$ and $B_{jk}(D)=L_j(S,A_k) \oplus CC(A_k,D)$. It follows that $U_{jk}(D) \geq B_{jk}(D)$. The routing entries at node S for destination node D are $\cup_k \cup_j R_{jk}(D)$, $1 \leq j \leq q(k)$ and $1 \leq k \leq n$. This set is ordered by comparing $U_{jk}(D)$ multicost values with respect to criterion C. If $U_{j_0k_0}(D)=U_{j_1k_1}(D)$ then ordering is accomplished by comparing $B_{j_0k_0}(D)$ and $B_{j_1k_1}(D)$. This ordered list is the conceptual routing table for destination node D in Node S.

Returning to the example network of FIG. 5, assume that this network is governed by the single criterion that monetary cost is more important than delay which is more important than hop count. Only the primary and secondary path information to node D with respect to node S are considered. The adjacent nodes to node S are node P and node B. Using Floyd's Algorithm, Dijkstra's Algorithm or inspection, the criterion cost ($E_1$, $E_2$, $E_3$) from node P to node D is determined to be (2, 12, 2). The composite constraint cost ($e_1$, $e_2$, $e_3$) is (2, 6, 2). Note that the constraint cost element for delay is less than the criterion cost element for delay. This implies that at least the minimal delay constraint cost is achieved on a different path than that which best satisfies the criterion. The absolute constraint cost (ae$_1$, ae$_2$, ae$_3$) is (2, 6, 2) also. But note that the CMs used for obtaining the absolute minimums do not all coincide with the CM used for the selected criterion.

In a similar manner, the criterion cost ($E_1$, $E_2$, $E_3$) from node B to node D is (5, 16, 3). The composite constraint cost ($e_1$, $e_2$, $e_3$) is (5, 7, 3). Since the delay constraint cost element is less than the delay criterion cost element, at least this constraint cost element was achieved on a different path than that which best satisfies the criterion. The absolute constraint cost (ae$_1$, ae$_2$, ae$_3$) from node B to node D is (5, 6, 3). Note that since the absolute constraint cost for delay is less than the composite constraint cost for the criterion, it must be achieved on a different path (either nodes, links between nodes, or both) from the path which minimizes the delay element for the constraint cost.

Adding the appropriate link costs from node S to node P or node B, the primary path cost is (3, 13, 3) with corresponding composite constraint and absolute constraint costs of (3, 7, 3) through the link to node P. Additionally, the secondary path cost is (6, 17, 4) with corresponding composite constraint cost (6, 8, 4) and absolute constraint cost of (6, 7, 4) through the link to node B.

Suppose it is desirable to route a call from node S to node D with the requirements that its monetary cost be no more than 9, its delay be no more than 9 and its hop count be no more than 5. This is formulated as a multicost call requirement of (9, 9, 5). If this allowed cost is compared with the primary path value of (3, 13, 3), it fails to meet the appropriate condition to route the call because the delay element of the primary path is too large. Note, however, the corresponding constraint cost is strictly less than the cost required by the call. As will be seen in the following, this implies that there may be a sub-optimal path from node S to node D through the link to node P which satisfies the cost requirements of the call.

Similarly, if the cost requirement of the call is compared against the secondary path value of (6, 17, 4) it also fails to meet the appropriate condition for routing the call since the delay element of the criterion cost is too large. If the cost requirement of the call is compared against the corresponding composite constraint cost, it is seen that the constraint cost is less than the call requirement cost. It follows that there may be some sub-optimal path from node S to node D through the link to node B which satisfies the cost requirement of the call. As discussed above, there is indeed such a path through node B. There is no path through node P even though it appears to be the primary (and therefore "best") choice.

The above defined criterion costs, composite constraint costs and absolute constraint costs can be used for path selection. Assume that a call is to be routed by a node S in the network to an ultimate destination node D according to some criterion, C. Suppose the corresponding maximal multi-cost metrics allowed for successful routing of the call are given by $M=(M_1, M_2, \ldots, M_i, \ldots, M_N)$. When node S tries to select a path to the next node toward the destination, it must use its ordered primary and secondary path information for node D with respect to the criterion, C, to find a suitable candidate link.

Let $R_D$ be the set of criterion-cost-ordered links in node S to be used in path selection to node D. Let Z be the number of entries in $R_D$. Finally let $E_z$ and $e_z$ be the link least-criterion-cost and link composite-constraint-costs respectively for the z-th entry of $R_D$, $1 \leq z \leq Z$.

If for some $1 \leq z \leq Z$, the maximal call matrices are such that $M_i \geq (E_z)_i$ for each individual cost component, then there is a path from node S to node D which has multicost metrics no more than those required by the call. It follows that there is at least one path, using the link corresponding to $E_z$, able to support the call within the desired metrics.

Suppose that for each $1 \leq z \leq Z$, the call metrics are such that $M_i < (E_z)_i$ for at least one individual cost component, but there is at least one index $z_0$, with $1 \leq z_0 \leq Z$, such that $M_i \geq (e_{z_0})_i$ for each individual cost function. Then there is at least one cost element of the call which may or may not have a path for which it can achieve the satisfaction of that cost element while still satisfying the other metrics of the other cost elements. Since the individual cost elements could achieve their individual constraint values along different paths, there is no guarantee that the call routed down the corresponding link will have a successful completion. As a consequence, if paths for which $M_i \geq (E_{z_0})_i$ do not exist or are not successful, then node S should select a link such that $M_i \geq (e_z)_i$ for each individual cost function.

Finally, if for each $1 \leq z \leq Z$, the condition $M_i < (e_z)_i$ for at least one individual cost component holds, then there is likely to be no successful path for the call from node S to node D. For, $e_z$ represents the lowest cost path, relative to criterion C, for the corresponding link. Therefore a call with smaller metrics has very low chance of completion using that link while preserving the topology of the network with respect to C. The absolute constraint costs may be such that $ae_i \leq M_i < (e_z)_i$ for at least one cost component. In this case, there is a remote possibility that a path exists which satisfies the metrics of the call. However, this situation is unlikely, at best, for two reasons. First, the CM topology used for the absolute constraint costs must have differed (in terms of link costs between nodes) from the topology used for the criterion C. Second, the path selection algorithm must allocate all the multi-costs associated with a given link while only the single cost component of a link, which minimizes a given cost component, is used in calculating the absolute constraint cost.

Consequently, attempting to route a call, based on absolute constraint costs, may on rare occasions produce a successful path selection. But much more typically, such path selection attempts will be fruitless with the additional undesirable affect of ineffectively using network resources. Therefore if, for all potential paths, a call has one of its metrics less than the corresponding constraint cost relative to a criterion, it is preferable to consider a "best effort" path which minimizes the most important cost component (for example) rather than to consider a path selections based on the absolute constraint cost metrics.

Special considerations must be taken when only two cost functions are considered for path selection. Suppose that $c_1$ and $c_2$ are two cost components comprising a multi-cost function. Then only two criteria are possible, either $c_1$ is more important than $c_2$, or the reverse is true. In this case, if C is one of the criteria, then the criterion and composite constraint costs with respect to C serve as a bound for routing a call within the limits of the criterion just as described above. The criterion cost with respect to C minimizes the "more important" of the two cost components with respect to C. The criterion cost of C', the remaining criterion, effectively gives the minimum of the second cost component. It can be used as the means of achieving the "best effort" routing if the metrics of the given call fail to yield a route because of failure in the "less important metric" to be within the bounds of criterion C. The use of these criterion cost metrics may introduce a potential path which satisfies the "less important metric", while satisfying the metrics (sub-optimally) for the "more important metric".

Figure 8:
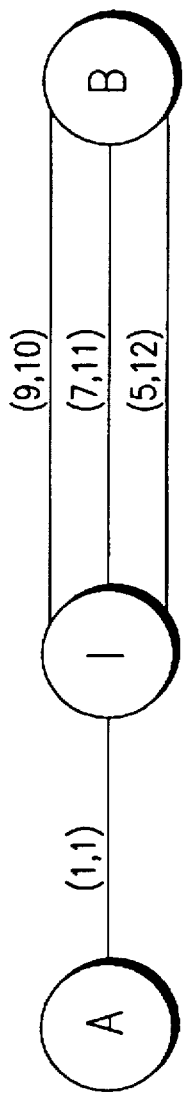
FIG. 8 is a schematic diagram illustrating that multiple cost metrics required by a call are not necessarily satisfied between two nodes even when individual call metrics are met.

It must be emphasized that this technique still does not ensure a path can be found. FIG. 8 illustrates such a situation. Here the ordered pairs represent the two costs. If criterion C is to consider the first cost to be more important, then the criterion cost will be (6, 13) from node A to node B. The criterion cost for C' is seen to be (10, 11). From these two criterion costs, it is inferred that the absolute constraint cost is (6, 11). But there is no path that achieves these cost metrics. In fact, if a call is to be routed from node A to node B with associated cost metrics of (7, 12), there is no path capable of routing the call. Node A might try to route such a call using a "best effort" service. Depending on the policy of the path selection in node I, either the (5, 12) or the (9, 10) link could be chosen to satisfy at least one of the cost metrics.

It should also be observed that this methodology does not, in general, extend to multi-cost functions of more than two cost components.

Routing choices can be effectively used in the path selection process. When there is a call request at a source network node, either there is an explicit multicost required or there is an implicit default multi-cost. In any event, it can be assumed that call set-up requests always contain a (maximum) multi-cost value, M, which must be satisfied to allow successful call completion. It can be further assumed that the source node knows the identity of the destination network node of the call and that each intermediate node participating in the path selection is aware of the total maximum allowed cost for the call request and of the multi-cost accumulated so far in the path selection process.

Suppose for example that $\{N(k)\}$, $k=1, \ldots, m$, is the sequence of consecutive nodes in a path from a source node $S=N(1)$ to a destination node $D=N(m)$. The intermediate nodes are to be determined so as to satisfy the multi-cost constraints, M, on the service request.

If $Q(k-1)$ is denied to be the accumulated multi-cost of the path from the source node S to node $N(k)$, and $P(k)$ is defined to be a path from node $N(k)$ toward node D with multi-cost $T(k)$, then each node $N(k)$ selects a path $P(k)$ predicated on the rules that:

M is greater or equal to $Q(k-1) \oplus T(k)$; and
if $P'(k)$ is any other possible choice, then:
  (a) if it is the rule to select a path which is the "best fit", then a path should be selected such that $Q(k-1) \oplus T(k)$ is less than or equal to $Q(k-1) \oplus T(k)$
  (b) if it is the rule to select the "best possible" path, then a path should be selected such that $Q(k-1) \oplus T(k)$ is greater than or equal to $Q(k-1) \oplus T(k)$ Where the "best fit" path is the path which provides performance closest to the requirements of the call and the "best possible" path is defined as the path which provides the "best" performance possible for the call, as described in greater detail below.

If $Q(0)$ is defined to be the 0 multi-cost value, then for $k=2, \ldots, m$, the value $Q(k-1)=Q(k-2) \oplus L[i_{(k-1)}, j_{(k)}]$, where $L[i_{(k-1)}, j_{(k)}]$ is the multi-cost of the link selected from node $N(k-1)$ to node $N(k)$. The value of $T(k)=L[i_{(k)}, j_{(k+1)}] \oplus W[i_{(k+1)}, j_D]$, where $W[i_{(k+1)}, j_D]$ is the multicost value at node $N(k)$ from the selected adjacent node $N(k+1)$ to the destination D as determined from the routing choice information.

For best fit routing, in order for node $N(k)$ to select a link to node $N(k+1)$, the criterion costs of the routing choices to destination D should be scanned from worst to best. The link corresponding to the first entry encountered, if any, which satisfies the condition that the remaining maximum multi-cost of the call (i.e. $M-Q(k-1)$ is greater or equal to the criterion cost, for each individual component cost, should be used to route to node $N(k+1)$. If there is no entry whose criterion cost satisfies this condition, then the routing choices should again be scanned from worst to best to select the first entry encountered such that each individual cost component of $M-Q(k-1)$ is greater or equal to each individual cost component of the composite constraint cost. During the search, if at any time an entry is encountered with $M_1 < e_1$, where $e_1$ is the first component of the composite constraint cost for the entry, then there is no path possible for the call and the search should be terminated. If a routing choice meeting the search condition is found, the path corresponding to this choice is a candidate for a possibly successful call completion. If the call routing attempt, using this choice, is unsuccessful, the search for additional possible choices should continue.

The effect of this best fit algorithm is to select a path which most closely matches the multi-cost requirements of the call request. There are numerous benefits of this path selection approach. First, an effective application of network resources is achieved. Call requests are evaluated against available potential path choices so that selection uses the least required resources to satisfy the cost function wherever possible. In this way, requests requiring premium performance can be reserved for those calls which are prepared to pay for this capability. Those call requests which can tolerate lower performance will use those resources as the criteria of choice. Only when lower performance resources are unavailable will higher performance resources be used.

For best possible routing, the minimum cost path available meeting the call requirements is selected. This is the intuitive method of path selection. The criterion costs of the routing choices to the destination are scanned from best to worst using the premium path first. This method has the advantage of allowing intermediate nodes within the path to elect sub-optimal paths with still having a high degree of certainty that the criterion will be met. However, this method may use resources for routing which are much better than required. If there is a later routing request with more stringent requirements, there may not be premium resources available to meet the requirements of the request.

No matter whether best possible or best fit routing is used, the path selection approach preserves path multi-cost information without explicit path knowledge. The cumulative cost information together with adjacency and local shortest path multi-cost information is all that is needed to permit allowable path evaluation at a node. Finally, this path selection approach provides ease of alternate path selection. If at some point along the path for call establishment, the most desirable selection of the next node is unobtainable, then either an alternate choice can be found (according to the algorithmic next best choice) or the path selection can be returned to the previous node by merely subtracting multi-costs locally known to the node.

Although the invention has been described and illustrated with respect to exemplary embodiments thereof, the foregoing and various other changes, omissions and additions may be made therein and thereto without departing from the spirit and scope of the present invention.

What is claimed is:

1. A method of network routing between nodes in the network, including the steps of:

defining cost functions to be taken into consideration when making routing choices;

prioritizing each of said cost functions with respect to one another to thereby provide a composite multi-cost function including said cost functions in a priority order;

defining a connectivity matrix for the network including ordered n-tuples having n elements, each n-tuple representing a multi-cost directly between each pair of nodes in the network, and each one of said elements of each n-tuple representing a cost function value of each one of said cost functions directly between each said pair of nodes in the network, wherein n is the number of said cost functions, and wherein said ordered n-tuples include each of said cost functions ordered in said priority order established in said step of prioritizing;

defining a generally additive operator such that distributive and commutative properties are applicable to a generally additive sum of said cost function values;

defining an ordering between a pair of said n-tuples by comparing said cost function value of respective elements;

deriving a shortest path matrix by applying said composite multi-cost function to said connectivity matrix using said generally additive operator and said ordering, said shortest path matrix including summation ordered n-tuples having multi-costs equal to the generally additive sum of said cost function values over a shortest path between each pair of nodes.

2. The method of claim 1, further including the steps of:

determining a multi-cost requirement indicative of the multi-cost of said cost functions required to satisfy a routing request between a pair of nodes;

comparing said multi-cost requirement to said summation ordered n-tuples between said pair of nodes; and determining that a path exists for routing between said pair of nodes if said summation ordered n-tuples between said pair of nodes satisfies said multi-cost requirement.

3. The method according to claim 1, wherein the nodes are interconnected by links;

said step of defining cost functions includes defining a cost function which is a Boolean representation of functionality supported by the network between each said pair of nodes; and each n-tuple of said connectivity matrix includes an element indicative of the functionality, in said ordering of functionality, available directly between each said pair of nodes.

4. The method according to claim 3, wherein said step of prioritizing each of said cost functions includes defining a mask of a desired functionality of a route between a pair of nodes of the network;

said step of defining a generally additive operator includes assigning an operator MAND for said Boolean representation defined in terms of said mask of desired functionality of a route; and said step of deriving said shortest path matrix includes deriving said summation n-tuples such that each summation n-tuple includes an element indicative of the fulfillment of said desired functionality available over said shortest path between each said pair of nodes.

5. The method of claim 1, wherein said step of deriving a shortest path matrix includes the step of taking the generally additive sum of said cost functions over a shortest path between each pair of nodes using Floyd's Algorithm.

6. The method of claim 1, wherein said step of deriving a shortest path matrix includes the step of taking the generally additive sum of said cost functions over a shortest path between each pair of nodes using Dijkstra's Algorithm.

7. The method of claim 1, further including the steps of:

determining a multi-cost requirement indicative of the multi-cost required to satisfy a routing request between a pair of nodes;

determining at least one primary path and any secondary paths between said pair of nodes which are used to satisfy said multi-cost requirement.

8. The method of claim 7, wherein said step of determining at least one primary path and any secondary paths includes the steps of:

defining said pair of nodes to include a source node and a destination node;

determining each adjacent node in the network directly connect to said source node;

defining a source-isolated connectivity matrix including ordered n-tuples representing the multi-cost directly between each pair of nodes in the network excluding said source node;

deriving a criterion cost as a shortest path between each said adjacent node and said destination node with respect to said composite multi-cost function by applying said composite multi-cost function to said source-isolated connectivity matrix using said generally additive operator and said ordering;

deriving a composite constraint cost as a shortest path between each adjacent node and said destination node with respect to each individual cost function by applying each individual cost function to said source-isolated connectivity matrix using said generally additive operator and said ordering of said individual cost function;

defining link least-criterion-costs between said source node and said destination node, each being the generally additive sum of said cost functions of each respective link from said source node to a respective one of said adjacent nodes and said criterion cost from said respective one of said adjacent nodes to said destination node;

defining link composite-constraint-costs between said source node and said destination node, each being the generally additive sum of said cost functions of each said respective link from said source node to said respective one of said adjacent nodes and said composite constraint cost from said respective one of said adjacent nodes to said destination node;

ordering said link least-criterion-costs;

defining said at least one primary path as a route between said source node and said destination node having said link least-criterion-costs with the smallest multicost; and defining said secondary paths as the remaining routes between said source node and said destination node.

9. The method according to claim 8, wherein each said secondary path is prioritized in inverse order with respect to the multi-cost of said link least-criterion-costs associated with each said secondary path.

10. The method according to claim 8, wherein said step of ordering said link least-criterion-costs includes determining said order by comparing associated link composite-constraint-costs if said link least-criterion-costs for two paths are the same.

11. The method according to claim 8, further including the step of comparing said multi-cost requirement to said link least-criterion-costs, and if said multi-cost requirement is greater than or equal to said link least-criterion-costs for each individual cost component, determining that there is a path from said source node to said destination node which satisfies said multi-cost requirement.

12. The method according to claim 11, wherein said step of comparing said multi-cost requirement to said link lease-criterion-costs further includes, if at least one element of said multi-cost requirement is less than a corresponding one of said link least-criterion-costs for each path, but there is at least one path wherein said multi-cost requirement is greater than or equal to said one of said link composite-constraint-costs for each individual cost function, then there may or may not be a path which satisfies said multi-cost requirement for said at least one element while still satisfying all other elements of the multi-cost requirement.

13. The method according to claim 12, wherein said step of comparing said multi-cost requirement to said link least-criterion-costs further includes, if said multicost requirement is less than one of said link composite-constraint-costs for at least one individual element for each path, then there is no successful path for satisfying said multi-cost requirement between said source node and said destination node.

14. The method of claim 9, wherein said step of routing includes routing over the lowest priority secondary path which satisfies said multi-cost requirement.

15. The method according to claim 1, wherein the nodes are interconnected by links;

each node and/or link may or may not support one or more service types generally available to the network;

said step of defining cost functions includes defining a cost function which is an ordering of said service types with respect to each one of said service types between each said pair of nodes; and said step of defining a connectivity matrix includes defining a plurality of connectivity matrices, each corresponding to a desired one of said service types, each n-tuple of said connectivity matrix including an element indicative of service type available between each said pair of nodes.

16. The method according to claim 15, wherein said step of defining a cost function which is an ordering of said service types with respect to each one of said service types includes assigning a value the magnitude of which is directly related to the desirability of said service types with respect to said one service type;

said step of defining a generally additive operator includes assigning an operator MAX for said service type cost function; and said step of deriving said shortest path matrix includes deriving said summation n-tuples such that each summation n-tuple includes an element indicative of the most desirable one of said service types with respect to said one of said service types available over said shortest path between each said pair of nodes.

17. The method of claim 16, wherein:

said step of defining cost functions further includes defining a cost function which is indicative of the number of links traversed between a pair of nodes;

said step of defining a connectivity matrix includes defining a plurality of connectivity matrices, each corresponding to one of said service types, where m is the number of service types, each n-tuple of said connectivity matrix including an element indicative of the number of links traversed with respect to each service type between each said pair of nodes, where each of said links traversed is assigned a weighted service-related value of 1, H+1, $(H+1)^2$, . . . . , $(H+1)^{m-1}$, with respect to said ordering of said service types, where H is the maximum allowed number of links traversed of all types between a source node and a destination node.

18. The method according to claim 1, wherein the nodes are interconnected by links;

each node and/or link may or may not be part of a virtual private network;

said step of defining cost functions includes defining a cost function which is indicative of the ability to route traffic associated with said virtual private network; and each n-tuple of said connectivity matrix includes an element indicative of the ability to route traffic associated with said virtual private network directly between each said pair of nodes.

19. The method of claim 18, wherein said step of deriving said shortest path matrix includes deriving said summation n-tuples such that each summation n-tuple includes an element indicative of the ability to route traffic associated with said virtual private network over said shortest path between each said pair of nodes.

20. The method of claim 9, wherein said step of routing includes routing over said at least one primary path or a highest priority secondary path which satisfies said multi-cost requirement.

* * * * *